United States Patent
Hanya et al.

(10) Patent No.: US 8,331,061 B2
(45) Date of Patent: Dec. 11, 2012

(54) HEAD SUSPENSION INCLUDING INTEGRAL PIEZOELECTRIC ELEMENT ELECTRODE SUPPORT MEMBER

(75) Inventors: Masao Hanya, Aikoh-gun (JP); Toshiki Ando, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 324 days.

(21) Appl. No.: 12/704,645

(22) Filed: Feb. 12, 2010

(65) Prior Publication Data

US 2010/0208390 A1 Aug. 19, 2010

(30) Foreign Application Priority Data

Feb. 16, 2009 (JP) ................... 2009-032263

(51) Int. Cl.
*G11B 21/10* (2006.01)
*G11B 5/596* (2006.01)
(52) U.S. Cl. .................................. 360/294.4
(58) Field of Classification Search ........... 360/294.4, 360/294.7
See application file for complete search history.

(56) References Cited

U.S. PATENT DOCUMENTS

| 7,130,159 B2 * | 10/2006 | Shimizu et al. ......... 360/294.4 |
| 2003/0142448 A1 * | 7/2003 | Koganezawa ............ 360/294.4 |
| 2004/0066585 A1 | 4/2004 | Shum |

FOREIGN PATENT DOCUMENTS

| JP | 2001-297547 | 10/2001 |
| JP | 2001-307442 | 11/2001 |
| JP | 2002-050140 | 2/2002 |
| JP | 2002-184140 | 6/2002 |
| JP | 2004-134067 | 4/2004 |

* cited by examiner

*Primary Examiner* — Craig A. Renner
*Assistant Examiner* — Gustavo Polo
(74) *Attorney, Agent, or Firm* — Jordan and Hamburg LLP

(57) ABSTRACT

A head suspension has a base plate, a load beam, and a piezoelectric element that is centrally located and deforms in response to applied power to precisely move a front end of the load beam. The head suspension includes an opening formed in the base plate to receive the piezoelectric element and a support member joined with the base plate, partly protruding into the opening, and configured to support an electrode of the piezoelectric element. The support member includes a pair of integral supports to support the electrode, and a pair of integral support links to connect the supports to each other outside the piezoelectric element.

9 Claims, 10 Drawing Sheets

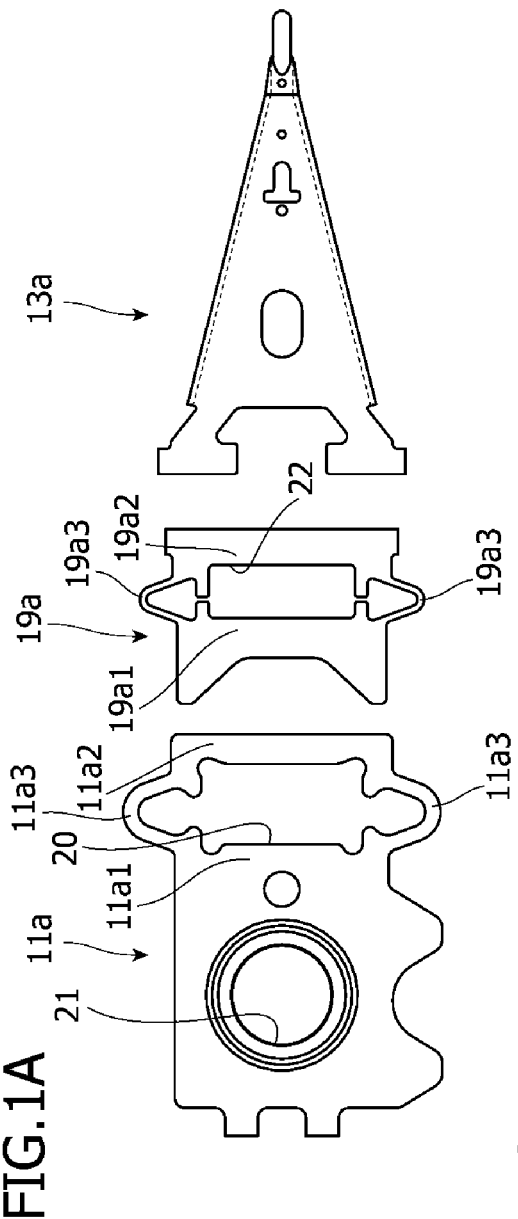
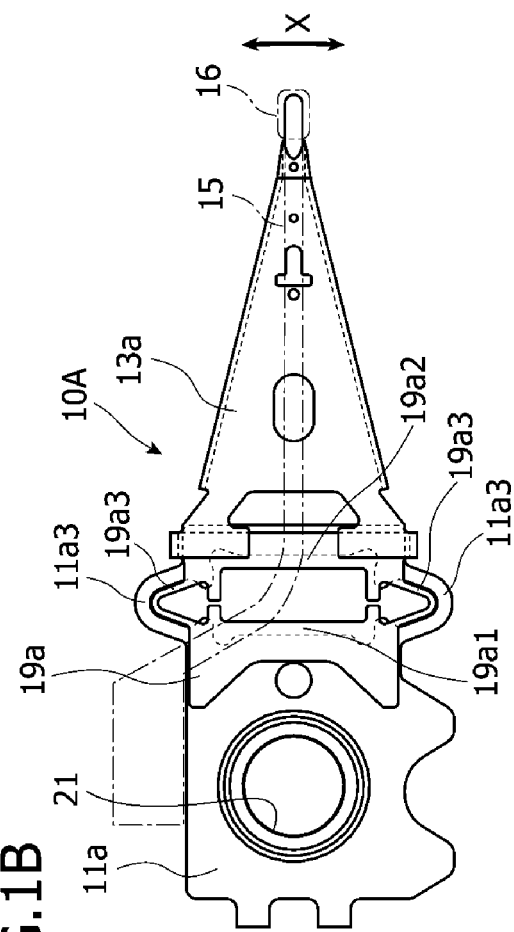
FIG.1A
FIG.1B

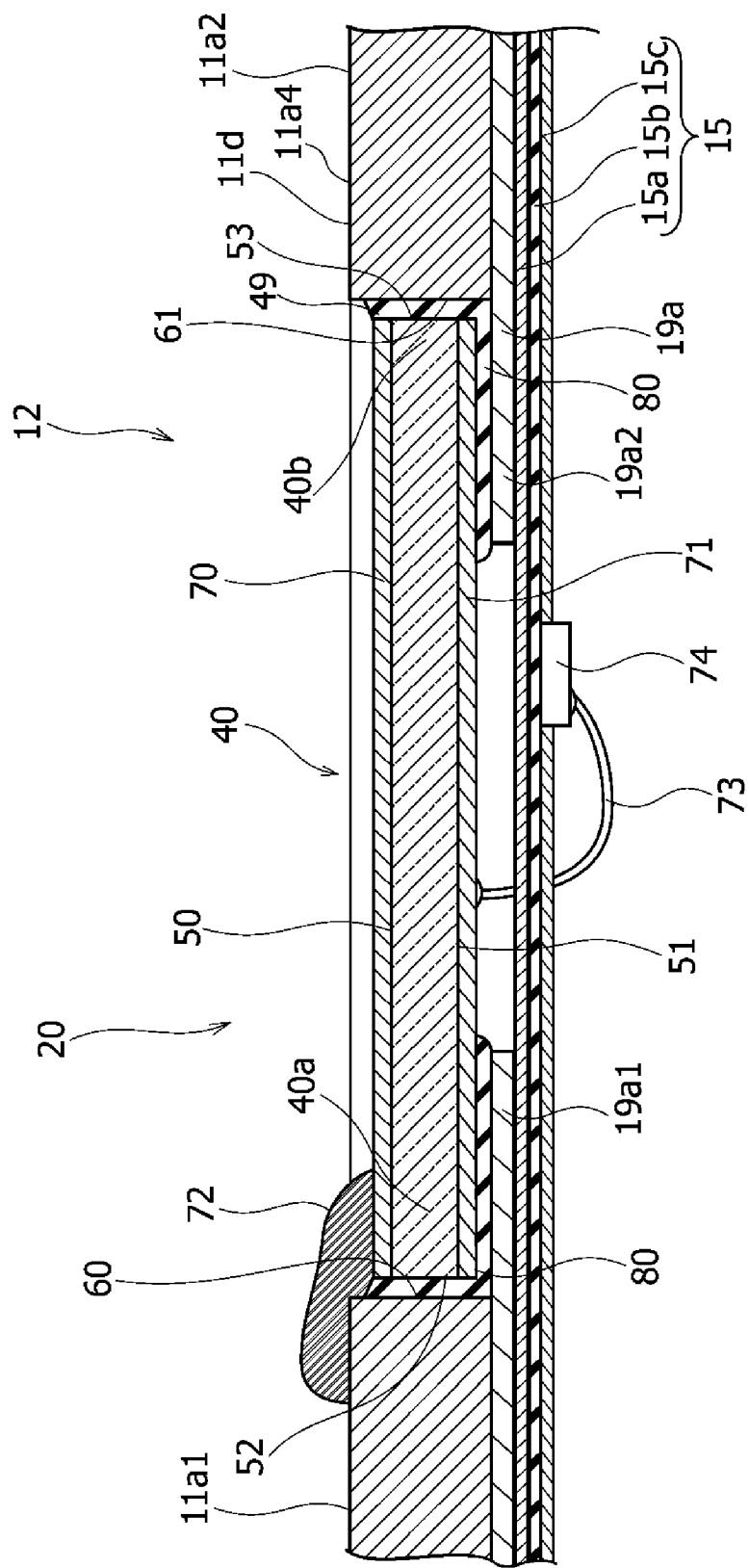

HEAD SUSPENSION INCLUDING INTEGRAL PIEZOELECTRIC ELEMENT ELECTRODE SUPPORT MEMBER

BACKGROUND OF THE INVENTION

1. Field of the Invention

The present invention relates to a head suspension for a disk drive incorporated in an information processing apparatus such as a personal computer.

2. Description of Related Art

Small-sized, precision information devices are rapidly advancing, and for use with such devices, needs for micro-actuators capable of conducting positioning control for very small distances are increasing. Such micro-actuators are highly needed by, for example, optical systems for correcting focuses and inclination angles, ink jet printers for controlling ink heads, and magnetic disk drives for controlling magnetic heads.

To meet the needs, the applicant of the present invention has proposed in Japanese Unexamined Patent Application Publication No. 2002-50140 a head suspension for a disk drive, including a base plate, a connection plate having a hinge thinner than the base plate, a load beam provided with a flexure, and a piezoelectric actuator composed of a pair of piezoelectric elements.

This related art employs a dual actuator system that involves, for a precise positioning purpose, a voice coil motor and the piezoelectric actuator having two piezoelectric elements made of, for example, PZT (lead zirconate titanate). The piezoelectric actuator in the dual actuator system minutely moves a front end of the load beam in a widthwise direction (sway direction) of the head suspension.

Compared with a single actuator system employing only the voice coil motor, the dual actuator system employing the voice coil motor and piezoelectric actuator is capable of more precisely positioning a magnetic head attached to a front end of the head suspension.

In the head suspension of the dual actuator system, the piezoelectric actuator is arranged in an opening formed in a piezoelectric element attaching part prepared on, for example, the base plate. This type of arrangement is disclosed in Japanese Unexamined Patent Application Publication No. 2001-307442.

The applicant of the present invention has proposed in the Japanese Unexamined Patent Application Publication No. 2002-50140 a technique of supporting an electrode of a piezoelectric element with a support that is formed at an opening formed in the base plate of the head suspension. The applicant of the present invention has also proposed in Japanese Unexamined Patent Application Publication No. 2002-184140 a technique of supporting a pair of piezoelectric elements with a support that has a base end, a front end, and a bridge extending along a center line of a head suspension to connect the base end and front end to each other. The base and front ends of the support hold front and rear ends of the piezoelectric elements that are arranged on each side of the bridge of the support.

These related arts involve many parts to complicate the structure for supporting the piezoelectric element. As a result, the head suspensions according to the related arts complicate manufacturing processes and make it difficult to secure assembling accuracy.

SUMMARY OF THE INVENTION

An object of the present invention is to provide a head suspension consisting of a reduced number of parts to support a piezoelectric element and capable of simplifying manufacturing processes and improving assembling accuracy.

In order to accomplish the object, an aspect of the present invention provides a head suspension having a base, a load beam, and a piezoelectric element that is arranged between the base and the load beam and deforms in response to applied power to precisely move a front end of the load beam relative to the base. The head suspension includes an opening formed in the base and configured to receive the piezoelectric element and a support member joined with the base, partly protruding into the opening, and configured to support an electrode of the piezoelectric element. The support member integrally has a base end support to support a base end of the electrode, a front end support to support a front end of the electrode, and a pair of support links to connect the base end support and front end support to each other outside the piezoelectric element.

This aspect of the present invention reduces the number of parts to support the piezoelectric element, thereby simplifying the manufacturing processes and improving assembling accuracy of the head suspension.

BRIEF DESCRIPTION OF THE DRAWINGS

FIGS. 1A and 1B are bottom views of a head suspension according to Embodiment 1 of the present invention, in which FIG. 1A illustrates essential parts of the head suspension and FIG. 1B illustrates the head suspension;

FIG. 3 is a sectional view taken along a line of FIG. 2;

FIGS. 4A and 4B are bottom views of a head suspension according to Embodiment 2 of the present invention, in which FIG. 4A illustrates essential parts of the head suspension and FIG. 4B illustrates the head suspension;

FIGS. 6A and 6B are bottom views of a head suspension according to Embodiment 3 of the present invention, in which FIG. 6A illustrates essential parts of the head suspension and FIG. 6B illustrates the head suspension;

FIGS. 8A and 8B are bottom views of a head suspension according to Embodiment 4 of the present invention, in which FIG. 8A illustrates essential parts of the head suspension and FIG. 8B illustrates the head suspension;

DETAILED DESCRIPTION OF EMBODIMENTS

Head suspensions according to embodiments of the present invention will be explained in detail with reference to the drawings. Each of the head suspensions employs the dual actuator system involving a voice coil motor and a piezoelectric actuator.

Figure 2:
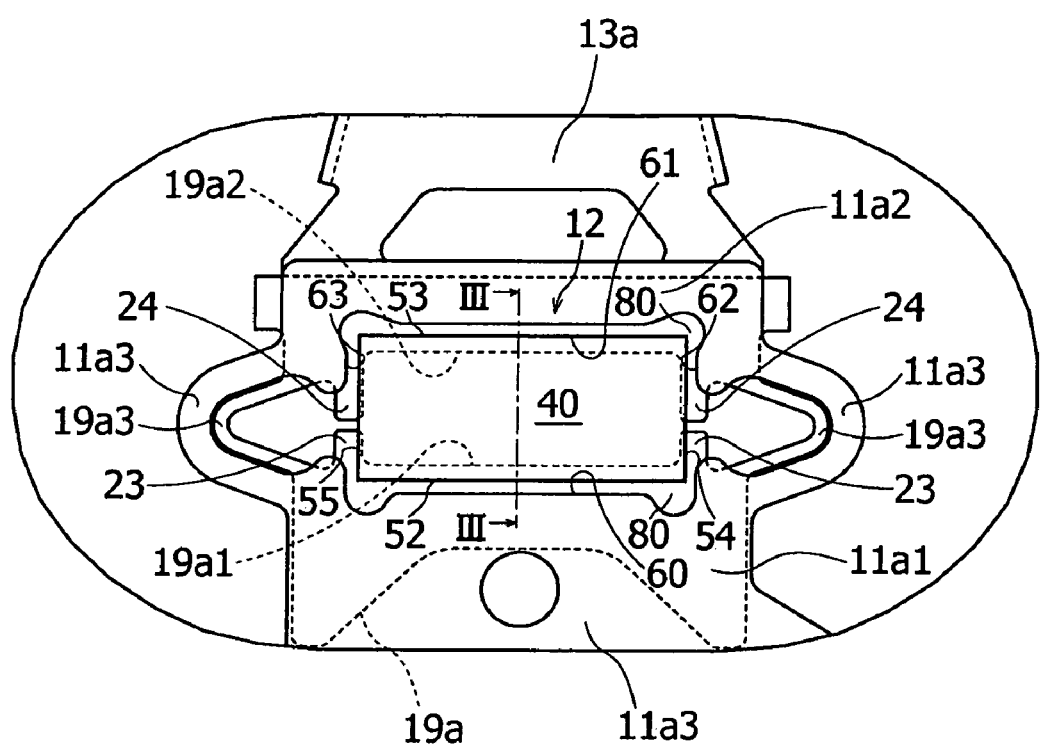
FIG. 2 is an enlarged top view illustrating a part around a piezoelectric element of the head suspension of FIG. 1B.

First, a head suspension according to Embodiment 1 will be explained with reference to FIGS. 1A to 3 in which FIG. 1A illustrates essential parts of the head suspension, FIG. 1B illustrates the head suspension, FIG. 2 is an enlarged top view illustrating a part around a piezoelectric element of the head suspension, and FIG. 3 is a sectional view taken along a line of FIG. 2.

In the following explanation, a base plate side of the head suspension is referred to as a base end or a rear end and a load beam side thereof is referred to as a front end or a front side. A surface side of the head suspension is a side opposite to a side where a magnetic disk is arranged and a back or bottom side of the head suspension is the side where a magnetic disk is arranged.

The head suspension 10A according to Embodiment 1 has a base plate 11a, a load beam 13a, a support member 19a, and a piezoelectric actuator 12.

The piezoelectric actuator 12 consists of a piezoelectric ceramic element (hereinafter referred to as "piezoelectric element") 40 that deforms in response to applied electric power, to slightly move a front end of the load beam 13a in a sway direction, i.e., a widthwise direction of the head suspension 10A.

The base plate 11a resiliently supports the load beam 13a and is made of a thin resilient stainless plate having a thickness in the range of, for example, 150 to 200 µm.

The base plate 11a has an opening 20 and a circular boss 21. The base plate 11a corresponds to the "base" stipulated in the claims. The base plate 11a integrally has a base end part 11a1, a front end part 11a2, and a pair of base links 11a3 to connect the base end part 11a and front end part 11a2 to each other outside the opening 20, i.e., on each side of the opening 20.

The opening 20 accommodates the rectangular piezoelectric element 40 as illustrated in FIGS. 2 and 3. The piezoelectric element 40 is made of, for example, PZT (lead zirconate titanate) that deforms in response to power applied thereto.

The base end part 11a1 of the base plate 11a is fixed to a front end of an actuator arm (not illustrated) driven by a voice coil motor (not illustrated). Each of the base links 11a3 has a U-shape outwardly protruding from the opening 20. With the base links 11a3, the front end part 11a2 flexes in sway directions X (FIG. 1B) relative to the base end part 11a1.

A flexure 15 is fixed to the bottom of the load beam 13a by, for example, laser spot welding as illustrated in FIG. 1B. A front end of the flexure 15 is provided with a magnetic head slider 16. The load beam 13a is made of a thin resilient stainless plate having a thickness in the range of, for example, 30 to 150 µm and functions to apply load onto the slider 16.

The flexure 15 is made of a thin resilient stainless plate that is thinner and more precise than the load beam 13a. As illustrated in FIG. 3, the flexure 15 is made of a conductive base layer 15a, an electric insulating layer 15b, and a conductor layer 15c that are laid one on another from the support member 19a side. The flexure 15 is fixed to the support member 19a at proper locations by, for example, laser spot welding.

The conductive base layer 15a is made of a thin metal plate such as a stainless thin plate. The insulating layer 15b is made of an electric insulating material such as polyimide resin. The conductor layer 15c is made of a conductive material such as copper and nickel. The conductor layer 15c functions to supply power to electrodes 70 and 71 of the piezoelectric element 40 and transmit write/read signals to and from the magnetic head slider 16.

The support member 19a is made of a thin resilient stainless plate having a thickness in the range of, for example, 20 to 50 µm.

The support member 19a integrally has a base end support 19a1, a front end support 19a2, and a pair of support links 19a3 to connect the base end support 19a1 and front end support 19a2 to each other on each outer side of the piezoelectric element 40. The support member 19a includes an opening 22 that corresponds to and smaller than the opening 20 of the base plate 11a.

The base end support 19a1 of the support member 19a corresponds to a part of the base end part 11a1 of the base plate 11a and laid thereon and fixed thereto by, for example, laser spot welding.

The front end support 19a2 of the support member 19a corresponds to the front end part 11a2 of the base plate 11a and laid thereon and fixed thereto by, for example, laser spot welding. The front end part 11a2 is fixed to a base end of the load beam 13a by, for example, laser spot welding.

Each of the support links 19a3 of the support member 19a has a U-shape outwardly extending on each side of the piezoelectric element 40. With the support links 19a3, the front end support 19a2 flexes relative to the base end support 19a1 in the sway directions X (FIG. 1B).

The support links 19a3 are slightly inside the base links 11a3 of the base plate 11a as illustrated in FIG. 1B. Namely, Embodiment 1 arranges the support links 19a3 so as not to overlap the base links 11a3.

In the piezoelectric actuator 12, the top and bottom faces of the piezoelectric element 40 are provided with the electrodes 70 and 71, respectively. The piezoelectric actuator 12 has a thickness in the range of, for example, 0.07 to 0.20 mm.

The piezoelectric element 40 has electrode forming faces 50 and 51 on the top and bottom faces thereof, rear and front end faces 52 and 53, and right and left side faces 54 and 55.

The piezoelectric element 40 is embedded in the opening 20 of the base plate 11a. Namely, as illustrated in FIG. 3, the piezoelectric element 40 is arranged in the opening 20 so that the electrode 70 on the top surface of the piezoelectric element 40 is flush with or lower than a surface 11d of the base plate 11a.

In the opening 20, the end faces 52 and 53 of the piezoelectric element 40 face rear and front side walls 60 and 61 of the opening 20 with a predetermined clearance between them. Also, the side faces 54 and 55 of the piezoelectric element 40 face side walls 62 and 63 of the base end part and front end part 11a1 and 11a2 of the base plate 11a with a predetermined clearance between them.

The top and bottom electrode forming faces 50 and 51 of the piezoelectric element 40 are entirely covered with the electrodes 70 and 71 made of a conductive material such as gold (Au), as illustrated in FIG. 3. The electrodes 70 and 71 may be formed by vapor deposition, spattering, or plating.

The electrode 70 is grounded to the base plate 11a through a conductive adhesive such as a silver paste 72. The electrode 71 is bonded through a wire 73 to a terminal 74 formed on the conductor layer 15c of the flexure 15.

The piezoelectric element 40 has a base end part 40a facing the base end support 19a1 and a front end part 40b facing the front end support 19a2.

From the rear and front side walls 60 and 61 of the opening 20, the base end support 19a1 and front end support 19a2 protrude to support the electrode 71 of the piezoelectric element 40.

The base end part 40a of the piezoelectric element 40 is fixed to the base end support 19a1 with a nonconductive adhesive 80. The front end part 40b of the piezoelectric element 40 is fixed to the front end support 19a2 with the nonconductive adhesive 80.

The nonconductive adhesive 80 may be a known nonconductive adhesive, a known conductive adhesive containing filler particles of insulating material such as silica and glass, and the like.

The nonconductive adhesive 80 forms a layer of proper thickness between the electrode 71 of the piezoelectric element 40 and the base end support 19a1 and front end support 19a2. The electrode 71 of the piezoelectric element 40 corresponds to the "electrode" stipulated in the claims.

It is preferable that the thickness of the nonconductive adhesive layer 80 is equal to or thicker than 10 μm. The insulating layer having such a thickness secures electric insulation between the electrode 71 and the base end support 19a1 and front end support 19a2.

In the clearance between the end faces 52, 53, 54, and 55 of the piezoelectric element 40 and the side walls 60, 61, 62, and 63 of the opening 20, the nonconductive adhesive 80 forms a layer having a proper thickness. The side walls 60, 61, 62, and 63 of the opening 20 correspond to the "side wall of the opening" stipulated in the claims.

To receive the nonconductive adhesive 80 filled in the clearance between the end faces 54 and 55 of the piezoelectric element 40 and the side walls 62 and 63 of the opening 20, the support member 19a has adhesive receivers 23 and 24 at locations corresponding to the end faces 54 and 55 of the piezoelectric element 40. The adhesive receivers 23 and 24 protrude along the end faces 54 and 55 of the piezoelectric element 40 and face each other with a slight gap between them.

The nonconductive adhesive layer 80 between the end faces 52, 53, 54, and 55 of the piezoelectric element 40 and the side walls 60, 61, 62, and 63 of the opening 20 surely transfers a distortion (displacement) of the piezoelectric element 40 to the load beam 13a and secures electric insulation between the electrodes 70 and 71 of the piezoelectric element 40 and the side walls 60, 61, 62, and 63 of the opening 20.

Receiving a voltage, a side of the piezoelectric element 40 contracts in a front-rear direction and the opposite side thereof extends in the same direction. As a result, the piezoelectric element 40 as a whole deforms into a trapezoid.

According to the direction and magnitude of the deformation of the piezoelectric element 40, the front end of the load beam 13a moves relative to the base plate 11a in a sway direction X (FIG. 1B).

To smoothly move the front end of the load beam 13a for a very small distance in a sway direction X, the base plate 11a employs the U-shaped base links 11a3 to provide the base end part 11a1 and front end part 11a2 with horizontal flexibility and vertical rigidity.

Similarly, the support member 19a employs the U-shaped support links 19a3 to provide the base end support 19a1 and front end support 19a2 with horizontal flexibility and vertical rigidity.

In this way, the head suspension 10A according to Embodiment 1 employs the support member 19a integrally having the base end support 19a1, the front end support 19a2, and the support links 19a3 to connect the supports 19a1 and 19a2 to each other on each side of the piezoelectric element 40. This configuration reduces the number of parts used to support the piezoelectric element 40.

The head suspension 10A according to Embodiment 1, therefore, simplifies the manufacturing processes thereof and improves the assembling accuracy thereof.

The support links 19a3 each have a U-shape to connect the base end support 19a1 and front end support 19a2 to each other. This configuration avoids an interference between the support member 19a and the piezoelectric element 40 when attaching the piezoelectric actuator 12 having the piezoelectric element 40 to the head suspension 10A. This prevents the occurrence of dust or a short circuit.

The base links 11a3 and support links 19a3 are arranged not to overlap each other. This prevents an interference between the base links 11a3 and the support links 19a3 during a sway operation of the piezoelectric actuator 12, thereby preventing the occurrence of dust or noise.

The support member 19a may be made from a thin metal plate such as a thin stainless steel plate by chemically etching the plate into a required shape. This technique precisely forms the support links 19a3 of the support member 19a, so that the support member 19a has an accurate spring constant in sway directions.

The base end support 19a1, front end support 19a2, and adhesive receivers 23 and 24 cooperate to receive the nonconductive adhesive 80 applied to the circumferential end faces of the piezoelectric element 40. This configuration secures electric insulation between the electrodes 70 and 71 of the piezoelectric element 40 and the opening 20 and prevents the circumferential end faces of the piezoelectric element 40 from producing dust.

The adhesive receivers 23 and 24, the electrode 71 and circumferential end faces of the piezoelectric element 40, the base end support 19a1 and front end support 19a2 facing the electrode 71, and the side walls of the opening 20 facing the circumferential end faces of the piezoelectric element 40 define an adhesive filling space. The piezoelectric element 40 is arranged in the opening 20 with the nonconductive adhesive 80 filled in the adhesive filling space. This configuration surely transfers a distortion (displacement) of the piezoelectric element 40 to the load beam 13a and secures electric insulation between the electrodes 70 and 71 of the piezoelectric element 40 and the side walls 60, 61, 62, and 63 of the opening 20. The nonconductive adhesive 80 covers the periphery of the piezoelectric element 40 that is brittle, to effectively protect the piezoelectric element 40.

The adhesive receivers 23 and 24 are spaced from each other on each side of the piezoelectric element 40, so that the base end support 19a1 and front end support 19a2 are movable relative to each other without regard to the adhesive receivers 23 and 24. This secures horizontal flexibility for the base end support 19a1 and front end support 19a2.

The head suspension 10A according to Embodiment 1, therefore, smoothly and precisely moves the piezoelectric actuator 12 in a sway direction X for a very small distance.

Figure 4A:
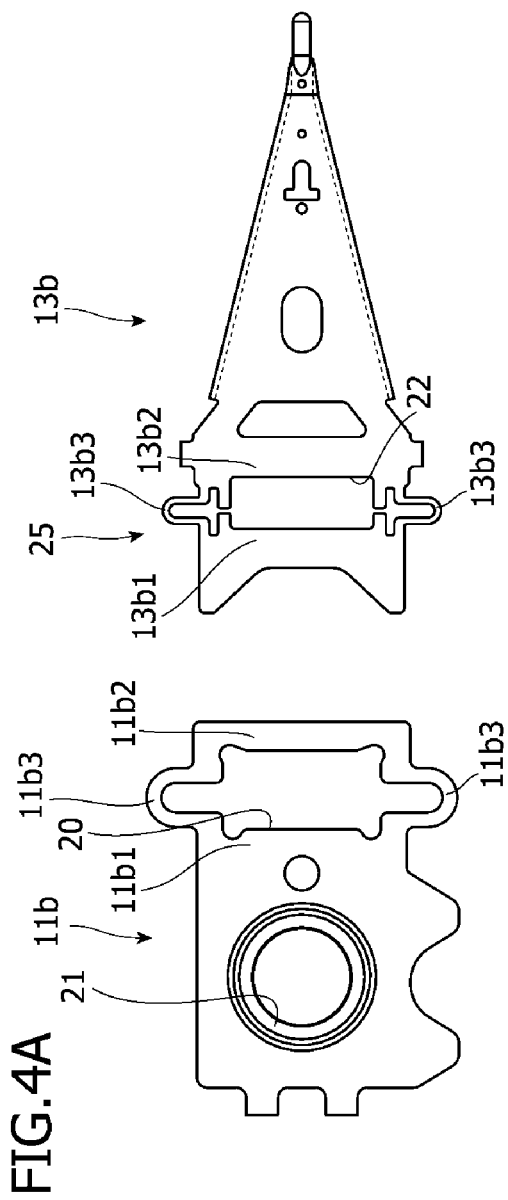
Figure 4B:
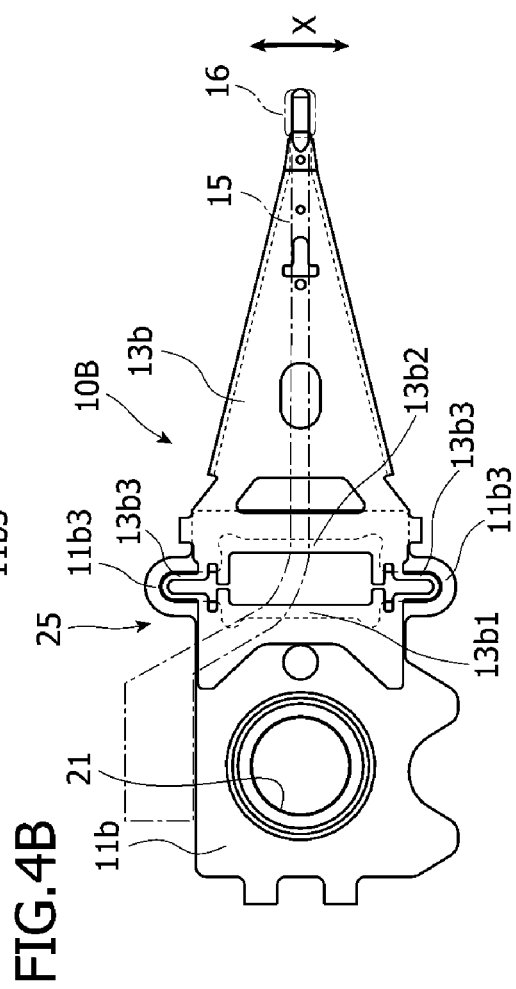
Figure 5:
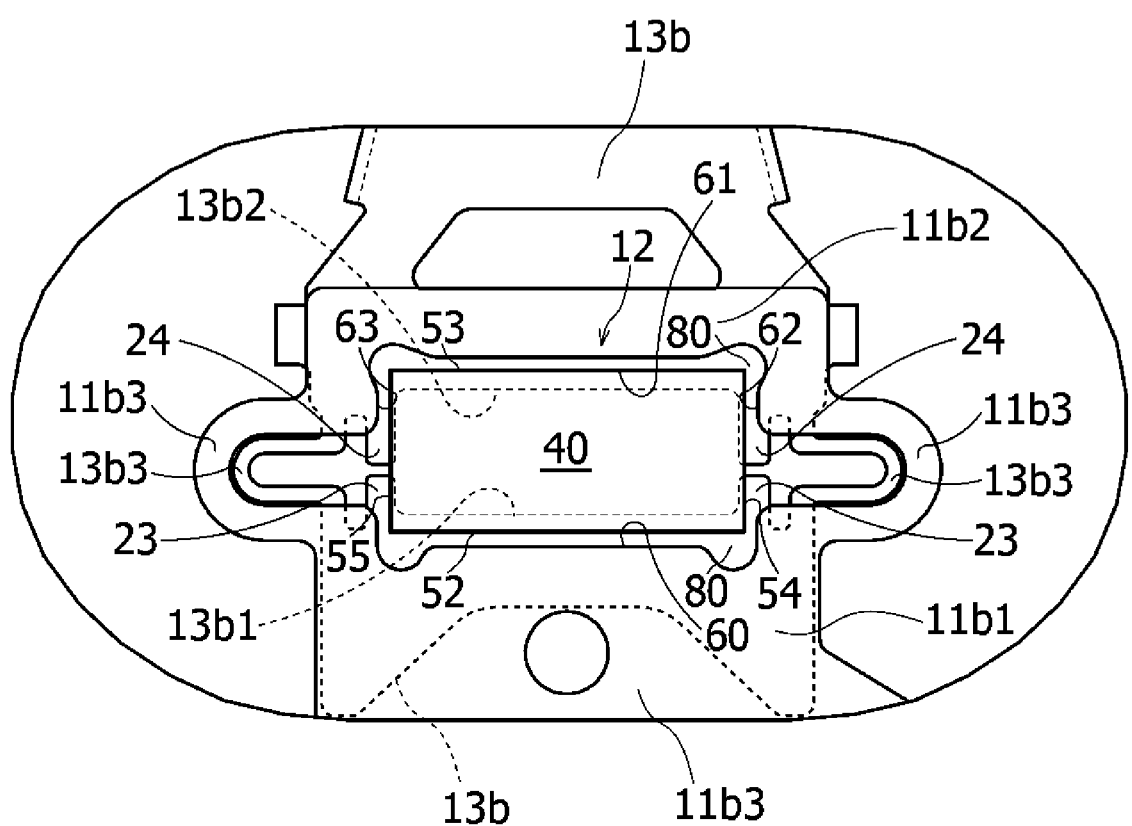
FIG. 5 is an enlarged top view illustrating a part around a piezoelectric element of the head suspension of FIG. 4B.

A head suspension according to Embodiment 2 will be explained in detail with reference to FIGS. 4A, 4B, and 5 in which FIG. 4A illustrates essential parts of the head suspension, FIG. 4B illustrates the head suspension, and FIG. 5 is an enlarged top view illustrating a part around a piezoelectric element of the head suspension.

The head suspension 10B of Embodiment 2 is basically the same as the head suspension 10A of Embodiment 1 except the configuration of a support member, and therefore, the parts common to the two embodiments are represented with the same reference marks to omit overlapped explanations.

In Embodiment 1, a part related to, for example, the base plate 11a is represented with "11a" plus a numeral. Like this, in Embodiment 2, a part related to, for example, a base plate 11b is represented with "11b" plus a numeral. This style of expression is to easily distinguish the different embodiments from each other.

Parts having similar reference marks such as the base end part "11a1" of Embodiment 1 and a base end part "11b1" of Embodiment 2 are substantially the same parts, and therefore, such parts will not be explained again. Mainly explained hereunder is a difference between Embodiments 1 and 2.

According to Embodiment 1, the head suspension 10A has the load beam 13a and support member 19a that are different parts as illustrated in FIG. 1A.

According to Embodiment 2, the head suspension 10B has a load beam 13b and a support member 25 that are integral with each other as illustrated in FIG. 4A.

More precisely, the load beam 13b according to Embodiment 2 has a base end that is integral with the support member 25. The support member 25 includes a base end support 13b1, a front end support 13b2, and a pair of support links 13b3 that connect the base end support 13b1 and front end support 13b2 to each other on each side of a piezoelectric element 40. The support member 25 also has an opening 22 that corresponds to and smaller than an opening 20 of a base plate 11b.

The load beam 13b is made of a thin resilient stainless plate having a thickness in the range of, for example, 30 to 150 μm like the load beam 13a of Embodiment 1. The load beam 13b of Embodiment 2 may be made of a thin resilient stainless plate having a thickness in the range of, for example, 20 to 50 μm thinner than that of Embodiment 1.

The base end support 13b1 of the support member 25 corresponds to a part of a base end part 11b1 of the base plate 11b and is laid thereon and fixed thereto by, for example, laser spot welding.

The front end support 13b2 of the support member 25 corresponds to a front end part 11b2 of the base plate 11b and is laid thereon and fixed thereto by, for example, laser spot welding.

The support links 13b3 of the support member 25 each outwardly protrude in a U-shape on each side of the piezoelectric element 40. With the support links 13b3, the front end support 13b2 flexes relative to the base end support 13b1 in sway directions X (FIG. 4B).

The support links 13b3 are arranged slightly on inner sides of base links 11b3 of the base plate 11b, so that the support links 13b3 may not overlap the base links 11b3.

In addition to the effect of Embodiment 1, the head suspension 10B of Embodiment 2 provides, due to the integration of the load beam 13b and support member 25, effects of further reducing the number of parts, simplifying manufacturing processes, and improving assembling accuracy.

Figure 6:
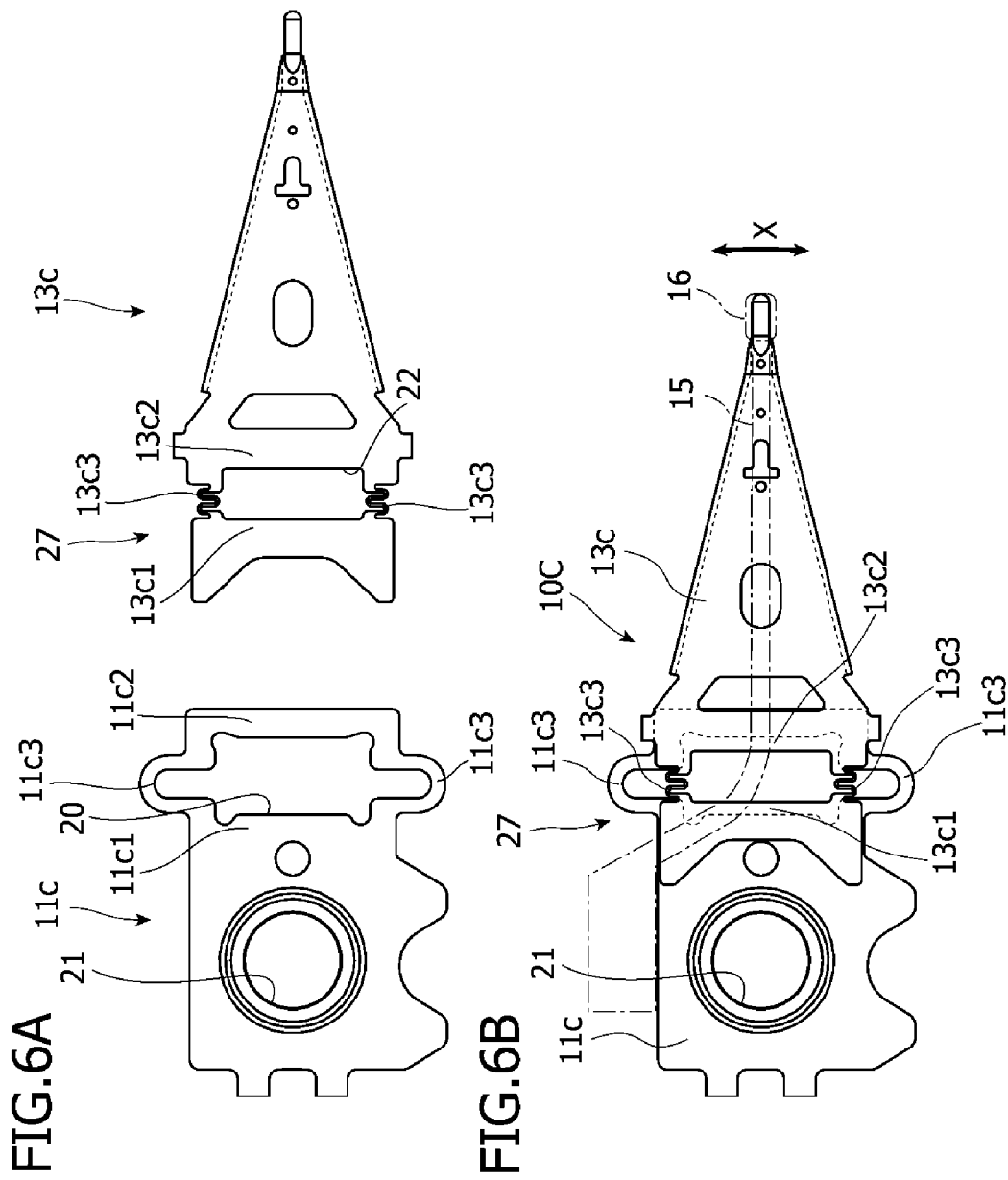
Figure 7:
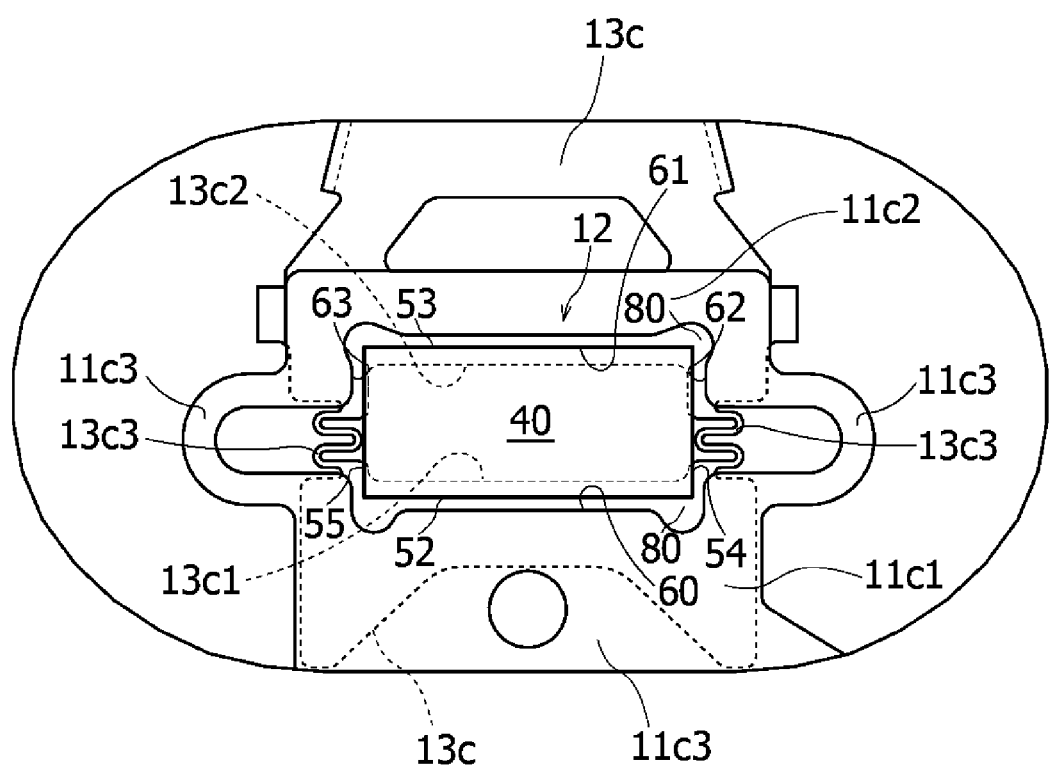
FIG. 7 is an enlarged top view illustrating a part around a piezoelectric element of the head suspension of FIG. 6B.

A head suspension according to Embodiment 3 will be explained in detail with reference to FIGS. 6A, 6B, and 7 in which FIG. 6A illustrates essential parts of the head suspension, FIG. 6B illustrates the head suspension, and FIG. 7 is an enlarged top view illustrating a part around a piezoelectric element of the head suspension.

The head suspension 10C of Embodiment 3 is basically the same as the head suspension 10B of Embodiment 2 except the configuration of a support member, and therefore, the parts common to the two embodiments are represented with the same reference marks to omit overlapped explanations. Mainly explained hereunder is a difference between Embodiments 2 and 3.

According to Embodiment 2, the base end support 13b1 and front end support 13b2 of the support member 25 are connected to each other with the support links 13b3 outside the piezoelectric element 40.

According to Embodiment 3, a support member 27 of the head suspension 10C has a base end support 13c1, a front end support 13c2, and a pair of support links 13c3 that connect the base end support 13c1 and front end support 13c2 to each other on outside a piezoelectric element 40. The support links 13c3 are flexible parts.

More precisely, the support links 13c3 of the support member 27 according to Embodiment 3 are winding springs, respectively.

The support links 13c3 may be used as adhesive receivers to receive a nonconductive adhesive 80 that is filled between end faces 54 and 55 of the piezoelectric elements 40 and side walls 62 and 63 of an opening 20 formed in a base plate 11c of the head suspension 10C.

In addition to the effects of Embodiments 1 and 2, the head suspension 10C according to Embodiment 3 provides, due to the flexible support links 13c3, i.e., the winding springs, effects of adding flexibility in sway directions and smoothing a sway operation.

To provide flexibility in sway directions like Embodiment 3, Embodiment 2 may thin the width of the support links 13b3. If this is achieved, however, Embodiment 2 deteriorates the rigidity of the load beam 13b in thickness directions and hinders the handling of the load beam 13b during manufacturing.

On the other hand, Embodiment 3 employs a winding spring for each of the support links 13c3, to secure the rigidity of a load beam 13c in thickness directions and the handling of the load beam 13c during manufacturing.

Figure 8:
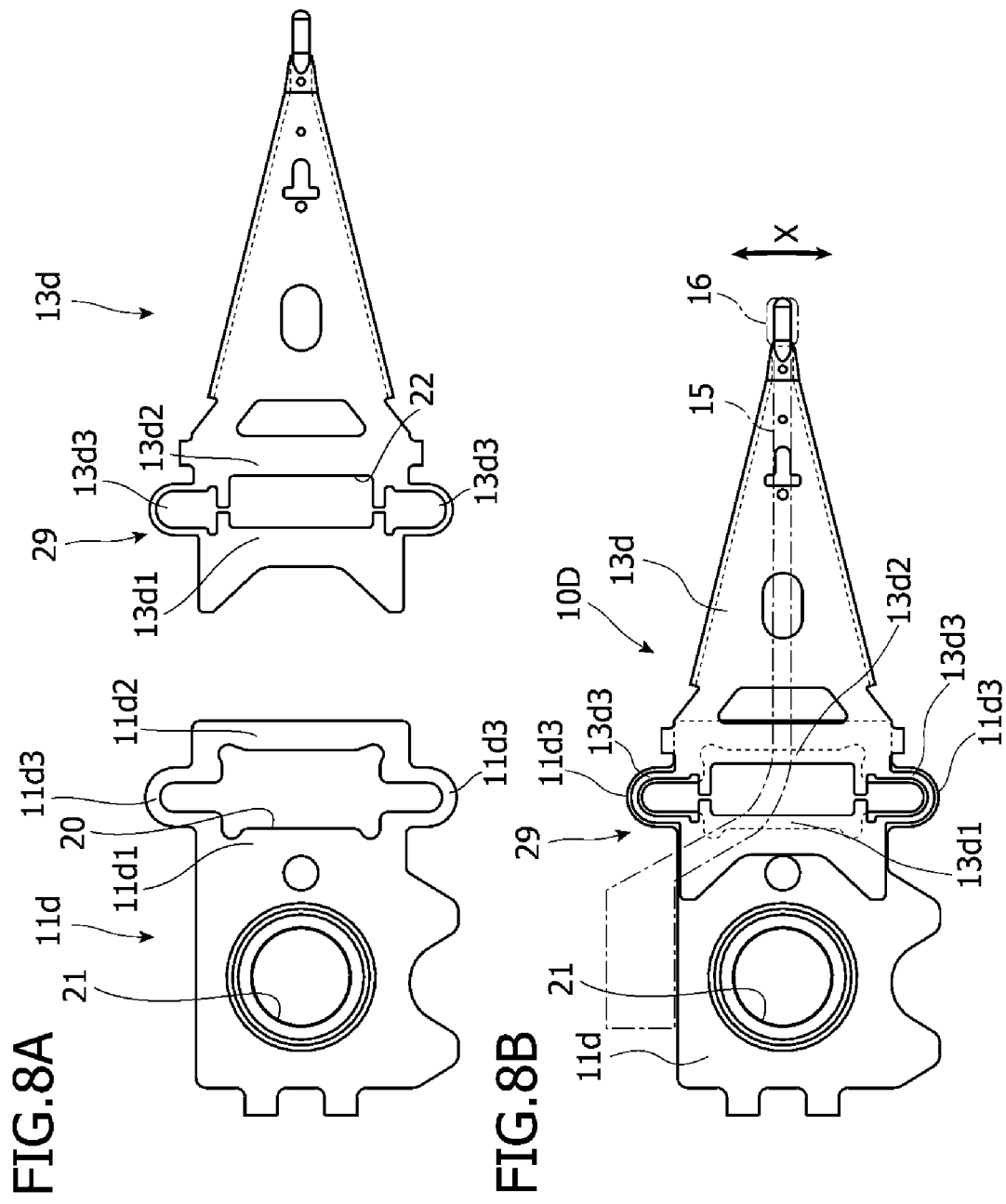
Figure 9:
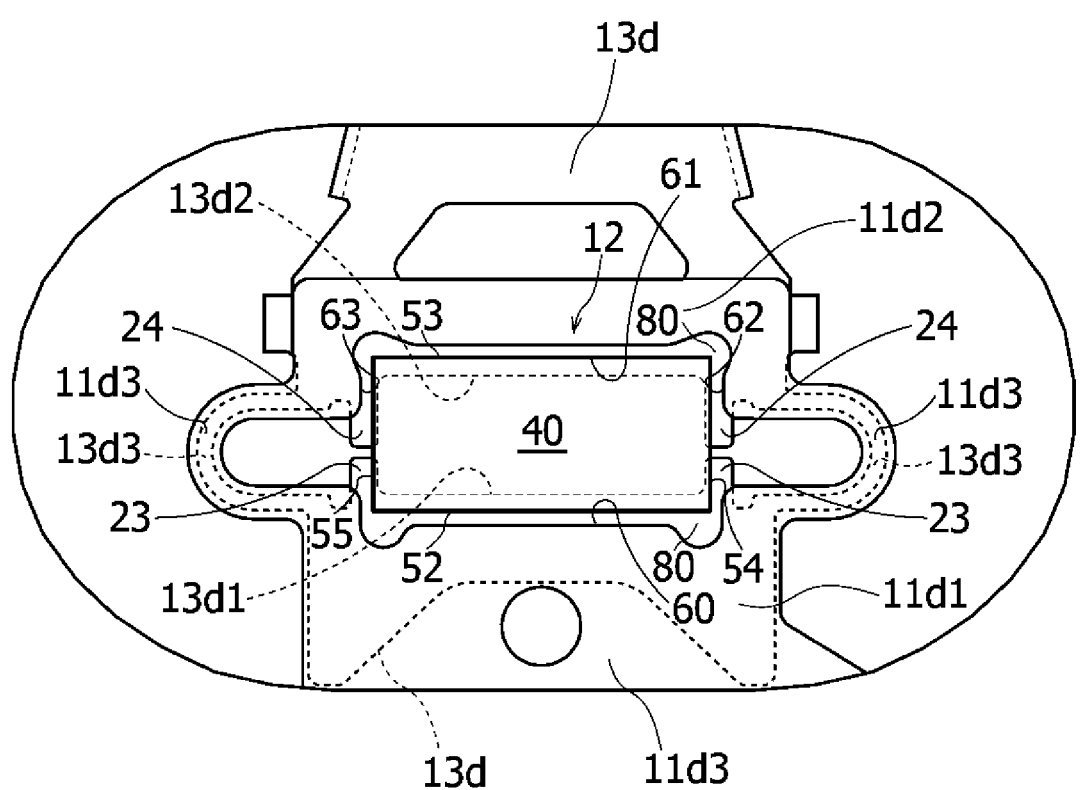
FIG. 9 is an enlarged top view illustrating a part around a piezoelectric element of the head suspension of FIG. 8B.

A head suspension according to Embodiment 4 of the present invention will be explained in detail with reference to FIGS. 8A, 8B, and 9 in which FIG. 8A illustrates essential parts of the head suspension, FIG. 8B illustrates the head suspension, and FIG. 9 is an enlarged top view illustrating a part around a piezoelectric element of the head suspension.

The head suspension 10D of Embodiment 4 is basically the same as the head suspension 10B of Embodiment 2 except the configuration of a support member, and therefore, the parts common to the two embodiments are represented with the same reference marks to omit overlapped explanations. Mainly explained hereunder is a difference between Embodiments 2 and 4.

According to Embodiment 2, the base links 11b3 and support links 13b3 are arranged not to overlap each other.

According to Embodiment 4, base links 11d3 and support links 13d3 are arranged to overlap each other and are fixed to each other by laser spot welding.

According to Embodiment 4, the head suspension 10D has a base plate 11d corresponding to the "base" stipulated in the claims. The base plate 11d has a base end part 11d1, a front end part 11d2, and the base links 11d3 that connect the base end part 11d1 and front end part 11d2 to each other on each side of an opening 20.

Each of the base links 11d3 has a U-shape outwardly protruding from the opening 20. With the base links 11d3, the front end part 11d2 is capable of flexing relative to the base end part 11d1 in sway directions X as illustrated in FIG. 8B.

A base end of a load beam 13d according to Embodiment 4 is integral with a support member 29. The support member 29 has a base end support 13d1, a front end support 13d2, and the support links 13d3 that connect the base end support 13d1 and front end support 13d2 to each other on each side of a piezoelectric element 40. The support member 29 has an opening 22 that corresponds to and smaller than the opening 20 of the base plate 11d.

The base end support 13d1 of the support member 29 corresponds to a part of the base end part 11d1 of the base plate 11d and is laid thereon and fixed thereto by, for example, laser spot welding.

The front end support 13d2 of the support member 29 corresponds to the front end part 11d2 of the base plate 11d and is laid thereon and fixed thereto by, for example, laser spot welding.

Each of the support links 13d3 of the support member 29 has a U-shape outwardly protruding on each side of the piezoelectric element 40. With the support links 13d3, the front end support 13d2 is capable of flexing relative to the base end support 13d1 in the sway directions X (FIG. 8B).

The support links 13*d*3 correspond to the base links 11*d*3 and are narrower than the base links 11*d*3.

The support links 13*d*3 and base links 11*d*3 according to Embodiment 4 are arranged to overlap each other and are fixed together by, for example, laser spot welding.

In addition to the effects of Embodiments 1 to 3, the head suspension 10D according to Embodiment 4 provides, due to the support links 13*d*3 and base links 11*d*3 that are overlapped each other and are fixed together by laser spot welding, an effect of preventing the links 13*d*3 and 11*d*3 from interfering with each other during a sway operation of a piezoelectric actuator 12 and an effect of producing no dust or noise. In addition, the overlapped and fixed links 11*d*3 and 13*d*3 improve the rigidity of the links.

The head suspension 10D according to Embodiment 4, therefore, can precisely move a front end of the load beam 13*d* for a very short distance in a sway direction X in response to a deformation of the piezoelectric actuator 12 while suppressing the vibration of the head suspension 10D itself.

Embodiments 1 to 4 are capable of optimizing an attaching state of the piezoelectric element 40 on the head suspension.

Figure 10:
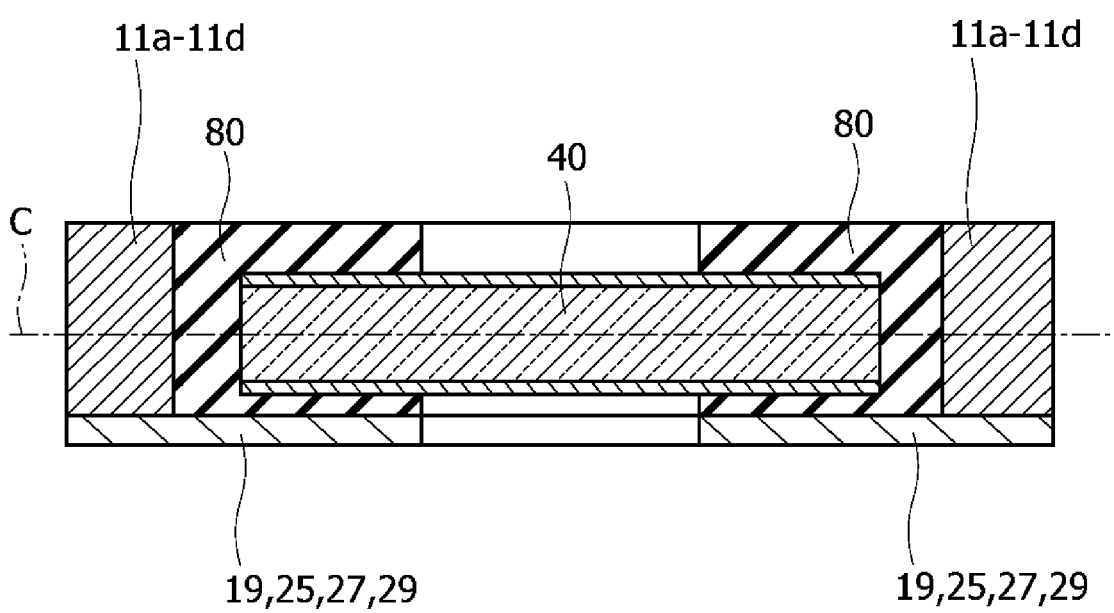
FIG. 10 is a sectional view illustrating a piezoelectric element attached to a head suspension according to one of Embodiments 1 to 4.

This will be explained with reference to FIG. 10. According to Embodiment 1 (2, 3, 4), the support member 19 (25, 27, 29) is separate from the base plate 11*a* (11*b*, 11*c*, 11*d*). It is easy, therefore, to align a center axis C of rigidity in a thickness direction of a structure made of the base plate 11*a* (11*b*, 11*c*, 11*d*) and support member 19 (25, 27, 29) with a center axis C in a thickness direction of the piezoelectric element 40 embedded in the opening 20. Aligning the center axes C with each other results in suppressing torsional vibration of the head suspension.

Accordingly, the head suspension 10A (10B, 10C, 10D) of Embodiment 1 (2, 3, 4) can precisely move the front end of the load beam for a very short distance according to a displacement of the piezoelectric actuator 12 while suppressing the torsional vibration of the head suspension itself.

The present invention is not limited to the above-mentioned embodiments. The embodiments are modifiable without departing from the gist and technical idea of the present invention disclosed in the claims and specification. Head suspensions based on such modifications also fall in the scope of the present invention.

For example, the present invention is applicable not only to the head suspension with a single piezoelectric element embedded in an opening of the head suspension but also to a head suspension with a plurality of piezoelectric elements arranged in an opening of the head suspension.

What is claimed is:

1. A head suspension having a base, a load beam, and a piezoelectric element that is centrally located and deforms in response to applied power to precisely move a front end of the load beam relative to the base, the head suspension comprising:
    an opening formed in the base that is configured to receive the piezoelectric element; and
    a support member joined with the base, partly protruding into the opening, and configured to support an electrode of the piezoelectric element,
        the support member integrally having a base end support to support a base end of the electrode, a front end support to support a front end of the electrode, and a pair of support links to connect the base end support and front end support to each other outside the piezoelectric element, and
        the base integrally having a base end part joined with the base end support, a front end part joined with the front end support, and a pair of base links to connect the base end part and front end part to each other outside the opening.

2. The head suspension of claim 1, wherein:
the base links outwardly protrude on each side of the opening;
the support links outwardly protrude on each side of the piezoelectric element; and
the base links and support links are arranged not to overlap each other.

3. The head suspension of claim 1, wherein:
the base links outwardly protrude on each side of the opening;
the support links outwardly protrude on each side of the piezoelectric element; and
the base links and support links are arranged to overlap each other.

4. The head suspension of claim 1, wherein:
the support member is integral with the load beam.

5. The head suspension of claim 1, wherein:
the support links are flexible parts.

6. The head suspension of claim 5, wherein:
the flexible parts are winding springs.

7. The head suspension of claim 1, further comprising:
an adhesive receiver configured to receive a nonconductive adhesive applied to cover a circumferential end face of the piezoelectric element.

8. The head suspension of claim 7, wherein:
the adhesive receiver is an adhesive filling space defined by the electrode and circumferential end face of the piezoelectric element, electrode facing parts of the base end support and front end support, and side walls of the opening that face the circumferential end face of the piezoelectric element; and
the piezoelectric element is arranged in the opening with the nonconductive adhesive being filled in the adhesive filling space.

9. The head suspension of claim 7, wherein:
the adhesive receiver has a gap between the base end side and front end side thereof on each side of the piezoelectric element.

* * * * *